US012694280B2

(12) United States Patent
Zhang et al.

(10) Patent No.: US 12,694,280 B2
(45) Date of Patent: Jul. 28, 2026

(54) INTERPRETABLE DEEP LEARNING-BASED DEFECT DETECTION AND CLASSIFICATION

(71) Applicant: KLA CORPORATION, Milpitas, CA (US)

(72) Inventors: Xu Zhang, Milpitas, CA (US); Li He, San Jose, CA (US); Sankar Venkataraman, Milpitas, CA (US)

(73) Assignee: KLA CORPORATION, Milpitas, CA (US)

( * ) Notice: Subject to any disclaimer, the term of this patent is extended or adjusted under 35 U.S.C. 154(b) by 1211 days.

(21) Appl. No.: 17/033,887

(22) Filed: Sep. 27, 2020

(65) Prior Publication Data

US 2022/0101114 A1     Mar. 31, 2022

(51) Int. Cl.
*G06N 3/08*          (2023.01)
*G06N 3/04*          (2023.01)

(52) U.S. Cl.
CPC ................. *G06N 3/08* (2013.01); *G06N 3/04* (2013.01)

(58) Field of Classification Search
CPC ....................................................... G06N 3/08
See application file for complete search history.

(56) References Cited

U.S. PATENT DOCUMENTS

| | | |
|---|---|---|
| 9,171,364 B2 | 10/2015 | Wu et al. |
| 2016/0025648 A1 | 1/2016 | Duffy et al. |

| | | | |
|---|---|---|---|
| 2018/0018553 A1 | 1/2018 | Bach et al. | |
| 2018/0107928 A1 * | 4/2018 | Zhang ..................... | G06N 3/082 |
| 2019/0156202 A1 * | 5/2019 | Falk ....................... | G06N 3/045 |
| 2020/0105500 A1 * | 4/2020 | Chou ...................... | H01J 37/28 |
| 2021/0073972 A1 * | 3/2021 | Wu .......................... | G06N 3/08 |
| 2021/0383530 A1 * | 12/2021 | Peleg ..................... | G06V 20/69 |

FOREIGN PATENT DOCUMENTS

| | | |
|---|---|---|
| CN | 110148106 A | 8/2019 |
| EP | 3654248 A1 | 5/2020 |
| TW | 202018281 A | 5/2020 |

OTHER PUBLICATIONS

"Assessment of Semiconductors by Scanning Electron Microscopy Techniques," Salviati et al., CNR-IMEM Institute, 2011. (Year: 2011).*
"Understanding intersection-over-union, " Robinson, Caleb (Year: 2018).*
"Scanning electron microscope," Wikipedia (Year: 2023).*

(Continued)

*Primary Examiner* — Michael J Huntley
*Assistant Examiner* — Paul J Breene
(74) *Attorney, Agent, or Firm* — Hodgson Russ LLP

(57)          ABSTRACT

An explanation of a detection/classification algorithm made using a deep learning neural network clarifies the results that are formed and helps a user to identify the root cause of defect detection/classification model performance issues. A relevance map is determined based on a layer-wise relevance propagation algorithm. A mean intersection over union score between the relevance map and a ground truth is determined. A part of one of the semiconductor images that contributed to the classification using the deep learning model based on the relevance map and the mean intersection over union score is determined.

14 Claims, 7 Drawing Sheets

SEM

LRP

Overlay

(56)          References Cited

OTHER PUBLICATIONS

"Layer-Wise Relevance Propagation," Montavon et al.(Year: 2019).*

"Super-resolution Technique for SEM Image of Semiconductor Device in Consideration of Plural Factors of Brightness Fluctuation," Miyamoto et al. (Year: 2013).*

"Layer-wise Relevance Propagation for Neural Networks with Local Renormalization Layers," arXiv, 2016, Binder et al; Binder (Year: 2016).*

"Characterization of a New Automated Electron-Beam Wafer Inspection System," Hendricks et al; Hendricks, KLA Instruments Corp, 1995. (Year: 1995).*

Fan, et al., "On Interpretability of Artificial Neural Networks: A Survey", arXiv preprint arXiv:2001.02522 (2020), 21 pages, USA.

Nam et al., "Relative Attributing Propagation: Interpreting the Comparative Contributions of Individual Units in Deep Neural Networks", Proceedings of the AAAI Conference on Artificial Intelligence, Apr. 3, 2020, pp. 2501-2508, vol. 34, Issue 3, PKP Publishing.

WIPO, ISR for International Application No. PCT/US2021/050563, Dec. 24, 2021.

Wen et al., "A Novel Method Based on Deep Convolutional Neural Networks for Wafer Semiconductor Surface Defect Inspection", IEEE Transactions on Instrumentation and Measurement, Jul. 6, 2020, pp. 9668-9680, vol. 69, Issue 12, IEEE Xplore.

Bach et al., On Pixel-Wise Explanations for Non-Linear Classifier Decisions by Layer-Wise Relevance Propagation, PLOS One, 2015, 0130140, 1-46.

Zintgraf et al., Visualizing Deep Neural Network Decisions: Prediction Difference Analysis, 2017, Int'l Conf. on Learning Representations, 1-12.

Selvaraju et al., Grad-CAM: Visual Explanations from Deep Networks via Gradient-Based Localization, 2017, International Conference on Computer Vision, 1-23.

Zeiler & Fergus, Visualizing and Understanding Convolutional Networks, 2013, arXiv:1311.2901.

Springenberg et al., Striving for Simplicity: The All Convolutional Net, 2015, Int'l Conf. on Learning Representations, 1-14.

TIPO, Office Action issued for TW Application No. 110134048, Feb. 7, 2025.

Bach et al., On Pixel-Wise Explanations for Non-Linear Classifier Decisions by Layer-Wise Relevance Propagation, PLoS One, 2015, 1-46, 0130140.

Zintgraf et al., Visualizing Deep Neural Network Decisions: Prediction Difference Analysis, arXiv, 2017, 1702.04595.

* cited by examiner

Overlay

101

LRP

SEM

100

200

Diff

LRP

Guided Bp

GradCam

FIG. 3

INTERPRETABLE DEEP LEARNING-BASED DEFECT DETECTION AND CLASSIFICATION

FIELD OF THE DISCLOSURE

This disclosure relates to process control for semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

Deep learning models can be used to identify and classify defects in inspection images. However, the classification result may not be subject to a step-by-step verification throughout the network architecture. The internal working of the deep learning model is "hidden," and the final decision of the deep learning model is not retraceable for each neuron in the network and is not known to a user. It is necessary to provide more trust in order to enhance quality.

Currently, the deep learning model performance is evaluated by observing output metrics and guessing a potential reason for performance issues. This can include observing a train loss curve. For detection, the receiver operating characteristic (ROC) can be observed with a detection map to guess why a defect was missed. For classification, the ROC can be observed with a confusion matrix to guess why a classification was missed. Using these current techniques, a user can only evaluate the output of a neural network. The user will not know why the neural network made the decision. Thus, the user needs to guess the root cause of the issue, which requires extensive domain knowledge. In the context of semiconductor manufacturing, it is difficult to resolve performance issues without an explanation why a neural network is making its decisions.

Therefore, new inspection and classification systems and methods are needed.

BRIEF SUMMARY OF THE DISCLOSURE

A method is provided in a first embodiment. The method comprises performing defect detection and classification on a plurality of semiconductor images using a processor with a deep learning model; applying, using the processor, a layer-wise relevance propagation algorithm on the semiconductor images from the deep learning model; determining, using the processor, a relevance map based on the layer-wise relevance propagation algorithm; determining, using the processor, a mean intersection over union score between the relevance map and a ground truth; and determining, using the processor, a part of one of the semiconductor images that contributed to the classification using the deep learning model based on the relevance map and the mean intersection over union score.

The relevance map can be based on a relevance of an output layer and relevance of early layers. In an instance, the relevance map is normalized. The relevance of the early layers can be determined for each layer using an equation $$R_i = \sum_j \frac{a_i w_{ij}}{\sum_i a_i w_{ij}} R_j.$$

$R_i$ is the relevance of a neuron i at a first layer, $R_j$ is a relevance of the neuron j at a second layer, $a_i$ is an activation of the neuron i, and $w_{ij}$ is a weight between the neuron i and the neuron j.

The method can further include smoothing the plurality of semiconductor images using the processor.

The method can further include changing an annotation of a training image for the deep learning model.

The method can further include changing a class code of a training image for the deep learning model.

The method can further include generating the semiconductor images with a wafer inspection tool that uses an electron beam.

A wafer inspection tool is provided in a second embodiment. The wafer inspection tool comprises an energy beam source that generates an energy beam; a stage configured to hold a wafer; a detector that receives the energy beam returned from the wafer; and a processor in electronic communication with the detector. The processor is configured to generate a plurality of semiconductor images using data received from the detector; perform defect detection and classification on the plurality of semiconductor images using a deep learning model; apply a layer-wise relevance propagation algorithm on the semiconductor images from the deep learning model; determine a relevance map based on the layer-wise relevance propagation algorithm; determine a mean intersection over union score between the relevance map and a ground truth; and determine a part of one of the semiconductor images that contributed to the classification using the deep learning model based on the relevance map and the mean intersection over union score. The energy beam can be an electron beam and the energy beam source can be an electron beam source.

The relevance map can be based on a relevance of an output layer and relevance of early layers. The relevance map can be normalized. The relevance of the early layers can be determined for each layer using an equation $$R_i = \sum_j \frac{a_i w_{ij}}{\sum_i a_i w_{ij}} R_j.$$

$R_i$ is the relevance of a neuron i at a first layer, $R_j$ is a relevance of the neuron j at a second layer, $a_i$ is an activation of the neuron i, and $w_{ij}$ is a weight between the neuron i and the neuron j.

A non-transitory computer-readable storage medium is provided in a third embodiment. The non-transitory computer-readable storage medium comprises one or more programs for executing the following steps on one or more computing devices. The steps include performing defect detection and classification on a plurality of semiconductor images using a deep learning model; applying a layer-wise relevance propagation algorithm on the semiconductor images from the deep learning model; determining a relevance map based on the layer-wise relevance propagation algorithm; determining a mean intersection over union score between the relevance map and a ground truth; and determining a part of one of the semiconductor images that contributed to the classification using the deep learning model based on the relevance map and the mean intersection over union score.

The relevance map can be based on a relevance of an output layer and relevance of early layers. The relevance map can be normalized. The relevance of the early layers can be determined for each layer using an equation $$R_i = \sum_j \frac{a_i w_{ij}}{\sum_i a_i w_{ij}} R_j.$$

$R_i$ is the relevance of a neuron i at a first layer, $R_j$ is a relevance of the neuron j at a second layer, $a_i$ is an activation of the neuron i, and $w_{ij}$ is a weight between the neuron i and the neuron j.

The steps can further comprise generating the semiconductor images using data from a wafer inspection tool that uses an electron beam.

DESCRIPTION OF THE DRAWINGS

For a fuller understanding of the nature and objects of the disclosure, reference should be made to the following detailed description taken in conjunction with the accompanying drawings, in which:

FIG. 3 shows a comparison of visualization methods;

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein provide an explanation of results by a detection/classification algorithm using a neural network. This explanation can assist users, such as semiconductor manufacturers, to understand deep learning results and how to diagnose and/or improve performance. Root cause of defect detection/classification model performance issues can be identified, which can assist a user to improve the model's performance. A quantitative score (mean intersection over union (mIoU)) can be determined between an LRP map and a ground truth annotation. This can provide annotation feedback to a user if the annotation is incorrect. This also can guide a user to improve detection and classification performance. The results can be used to interpret deep learning-based defect detection and classification using LRP.

Figure 1:
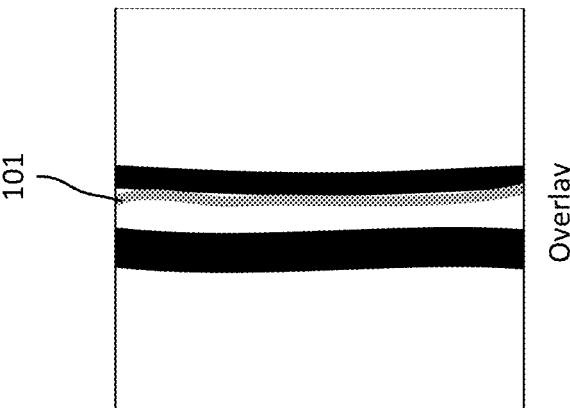
FIG. 1 shows corresponding exemplary semiconductor images with a scanning electron microscope (SEM) image on the left, a layer-wise relevance propagation (LRP) image in the center, and an overlay with SEM and LRP on the right.
Figure 1:
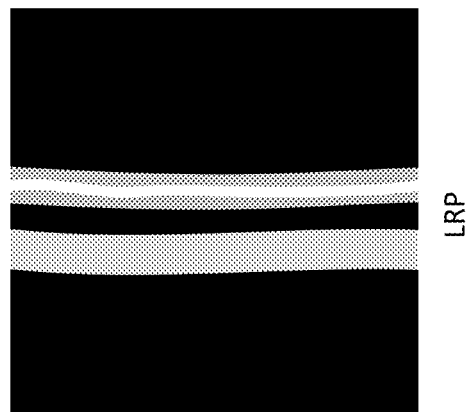
Figure 1:
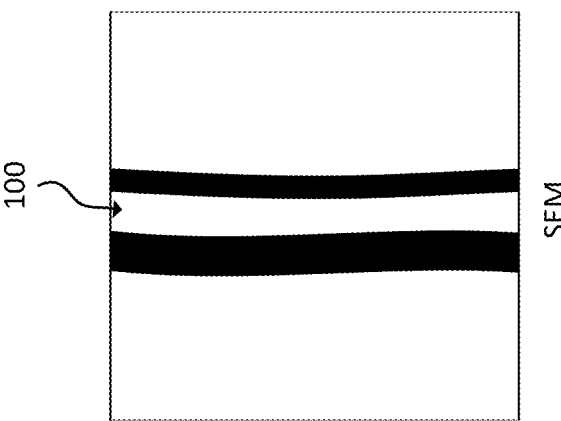

FIG. 1 shows corresponding exemplary semiconductor images with an SEM image on the left, an LRP image in the center, and an overlay with SEM and LRP on the right. As shown in the SEM image, the trench 100 is not centered in the structure (shown in black outline). When making a decision to detect a defect or classify the defect due to the position of the trench 100, a deep learning model looks at the region 101 (shown in grey) from the overlay image in this example. The region 101 can lead the deep learning model to detect/classify the defect in FIG. 1. Embodiments disclosed herein can help identify the region 101 to assist a user's understanding of the deep learning model's operation.

Figure 2:
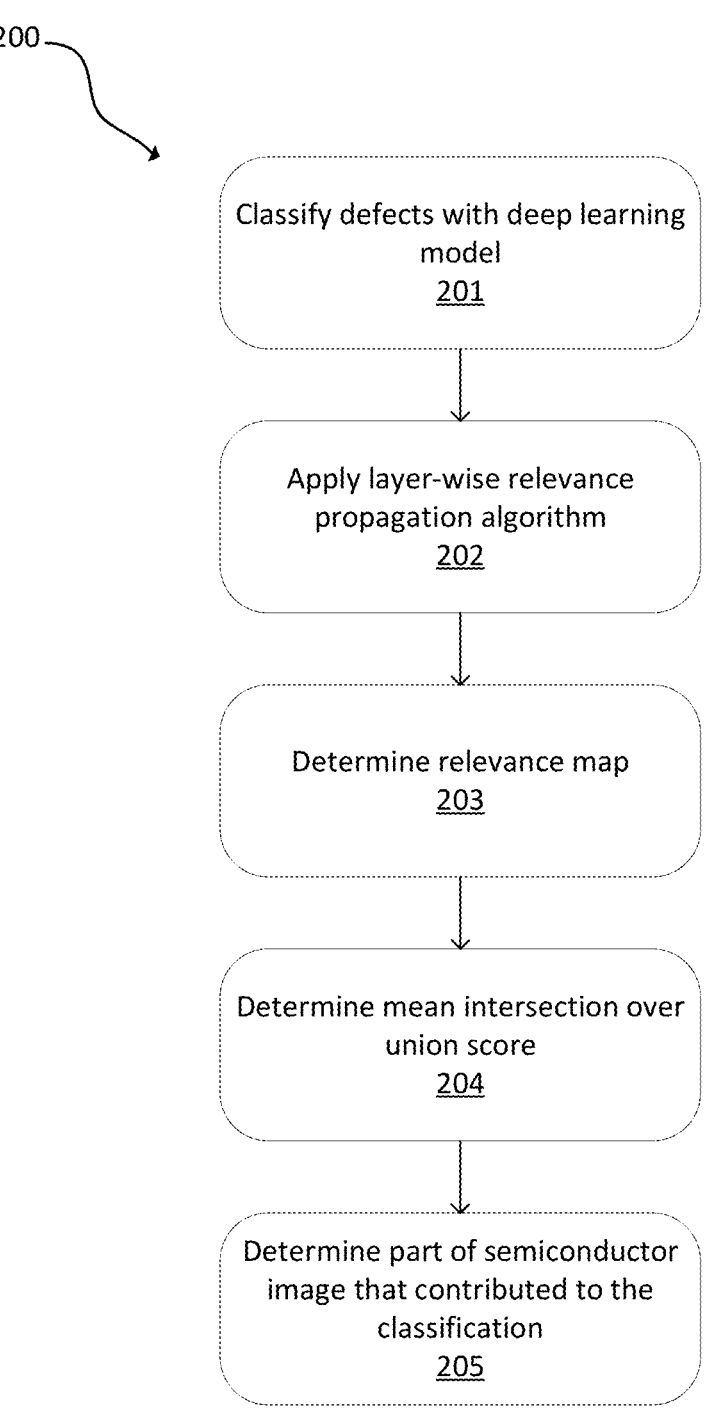
FIG. 2 is a flowchart of a method embodiment in accordance with the present disclosure.

FIG. 2 is a flowchart of a method 200. Some or all of the steps of the method 200 can be run on a processor. At 201, defect detection and classification is performed on semiconductor images using a deep learning model. In an instance, the deep learning model is a convolutional neural network (CNN). The semiconductor images can be generated using, for example, a wafer inspection tool that uses an electron beam such as an SEM.

The deep learning model can be trained with training images. These training images can be annotated and can be categorized by class code.

An LRP algorithm is applied on the semiconductor images from the deep learning model at 202. LRP is a framework to decompose a prediction of a neural network computed over a sample (e.g., an image) down to relevance scores for the single input dimensions of the sample such as subpixels of an image. An LRP algorithm is disclosed in Bach et al., "On pixel-wise explanations for non-linear classifier decisions by layer-wise relevance propagation," PloS one 10 (2015), which is incorporated by reference in its entirety.

During the forward pass, the trained neural network will propagate the input through the network to make a prediction at the output layer. The relevance of the output layer is the predicted probability of the class that the user chooses to investigate, which is usually the one with the maximum value. The maximum value is the one with maximum probability. In other words, it means the network is most confident in that class. During the backward pass, the relevance of early layers is computed layer by layer backward using an equation $$R_i = \sum_j \frac{a_i w_{ij}}{\sum_i a_i w_{ij}} R_j.$$

$R_i$ is the relevance of a neuron i at a first layer (e.g., an earlier layer), $R_j$ is a relevance of the neuron j at a second layer (e.g., a later layer), $a_i$ is an activation of the neuron i, and $w_{ij}$ is a weight between the neuron i and the neuron j.

In an instance, the neural network may include approximately 50 layers. However, more layers or fewer layers may be used.

Figure 3:
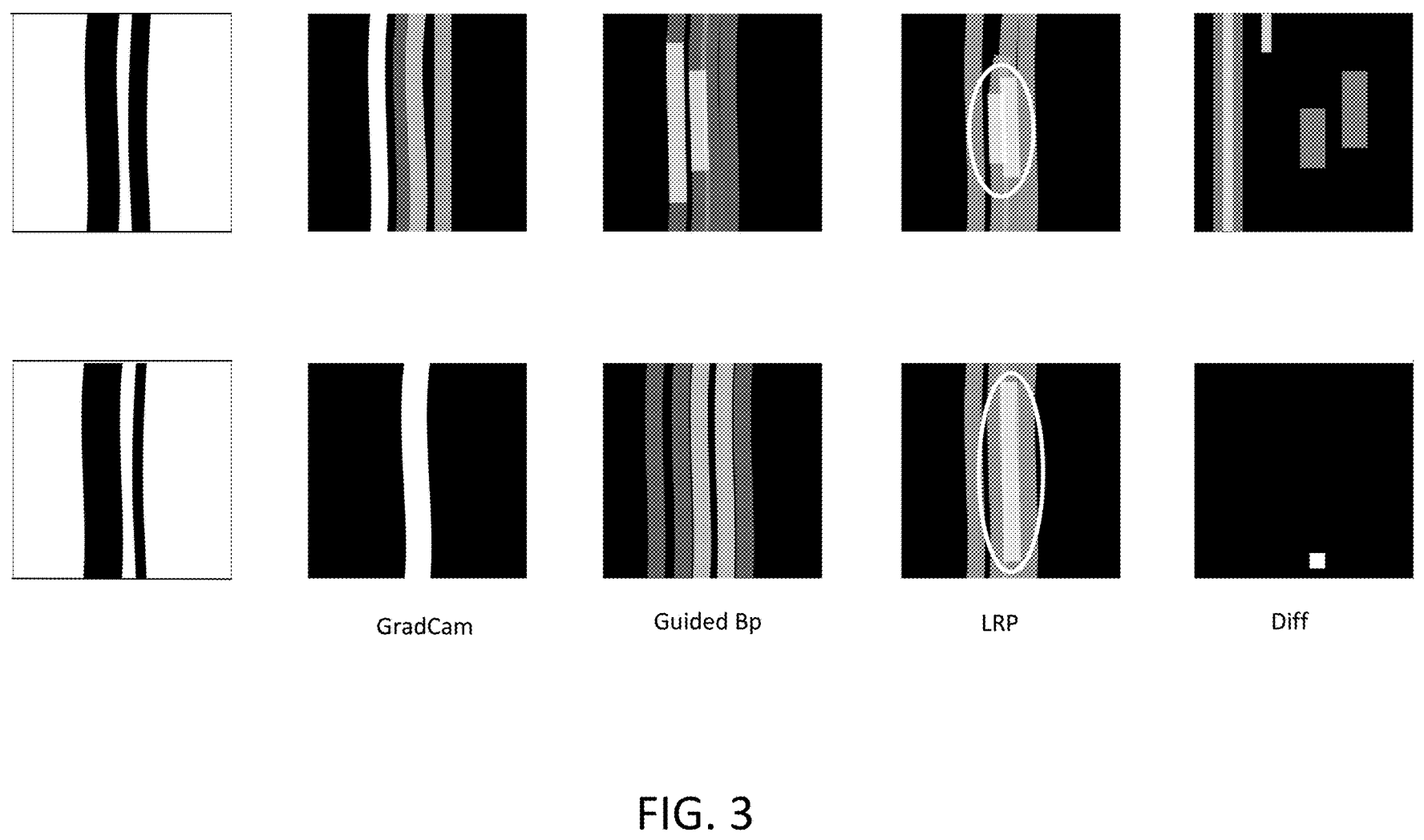

At 203, a relevance map based on the layer-wise relevance propagation algorithm is determined. Relevance can be calculated ($R_j$) from output layer j backward to input layer i. Iteration can be performed until the image layer is reached. The relevance map can be based on a relevance of the output layer and the relevance of the early layers. The relevance map can be normalized, such as to between [0, 255]. For example, an exemplary relevance map is shown in FIG. 3.

Turning back to FIG. 2, a mean intersection over union (mIoU) score between the relevance map and a ground truth is determined at 204. Intersection over union is the area of overlap divided by the area of union. Thus, the true positives can be divided by a sum of the true positives, false positives, and false negatives. mIoU can determine the overlap between the network prediction and the ground truth. The mIoU determination can be used to find which training image or annotation is causing the user's results.

For a correct training image, running LRP should provide the high mIoU with its image label while the incorrect training image should provide low mIoU. The highlighted part is a portion of the relevance score. The mIoU is a number that is determined using the relevance map with the image's original label.

At 205, a part of one of the semiconductor images that contributed to the classifying using the deep learning model is determined based on the relevance map and the mIoU score. A threshold of the mIoU can be set on all the images that are run and to find examples that have an mIoU less than a threshold value to determine the problematic SEM image, which has wrong annotations.

For example, FIG. 1 shows exemplary semiconductor images. As shown with the region 101, a visual display on a relevance map can provide information about the part of the image used by the neural network. Using the LRP relevance map and mIoU score, the part of the input image contributing to the neural network decision can be displayed. The overlay of the threshold mIoU on the original SEM image may be used to highlight the contributing part of the image. The ground truth used by the neural network can be quantitatively measured. A user can receive guidance about next steps or how to fix performance issues with the neural network. This region 101 can guide a user when determining why an image is classified or not.

In an instance, a Gaussian kernel or other technique is used to smooth an image prior to making a determination. Pre-processing the images to remove noise improves mIoU performance.

The method 200 can further include changing an annotation of a training image or a class code of a training image. For example, the region 101 in FIG. 1 can be used as a basis to change an annotation or class code. An annotation can be changed if a non-defect area contributed to detection. A class code can be changed in an image contributes an incorrect class code. More training images also can be used for a particular structure or defect class if it will improve the defect detection or classification. For example, more training images of a structure can be provided to the neural network if the structure is not used by the neural network or if relevance map values are low to none.

In an instance, misclassification between class A and class B is caused by the annotation of class C in the training images. From an LRP relevance map, the part of the image that may contribute to class C can be determined.

While LRP is disclosed, other deep learning visualization methods can use the embodiments disclosed herein. Thus, GradCam, deconvolution, and Guided-BP all can benefit from the embodiments disclosed herein. LRP demonstrates improved focus and tends to capture useful information. As shown in FIG. 3, compared with GradCam, LRP captures more detail information that may contribute to the results. In FIG. 3, Diff is the prediction difference analysis described in Zintraf et al, "Visualizing Deep Neural Network Decisions: Prediction Difference Analysis" (2017), which is incorporated by reference in its entirety. LRP provides improved results compared to Diff. Compared with Guided Bp, LRP shows more continuous relevance map while Guided Bp has of breaks due to discontinuous gradients.

Figure 4:
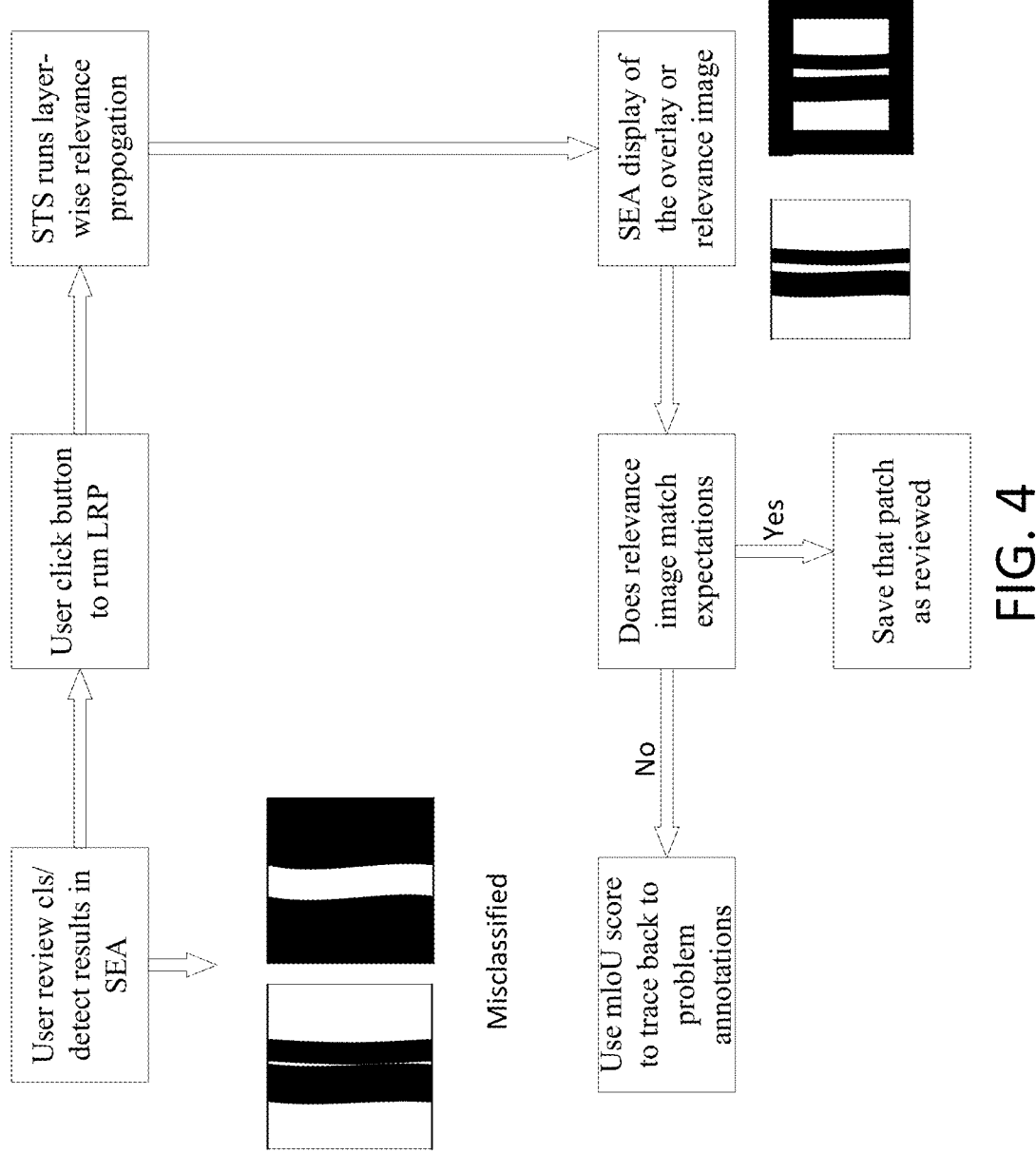
FIG. 4 illustrates a flowchart of an embodiment of a potential user interface in accordance with the present disclosure.

FIG. 4 illustrates a flowchart for a user interface. A user can review classification (cls) and detection (detect) results in smart example annotation (SEA). A user can begin the LRP. The SMARTS training station (STS) runs layer-wise relevance propagation. The SEA can display the overlay or relevance image. The user can determine if the relevance seems acceptable. If yes, the patch can be saved as it was reviewed. If no, then the mIoU score can be used to determine any problematic annotations.

Figure 5:
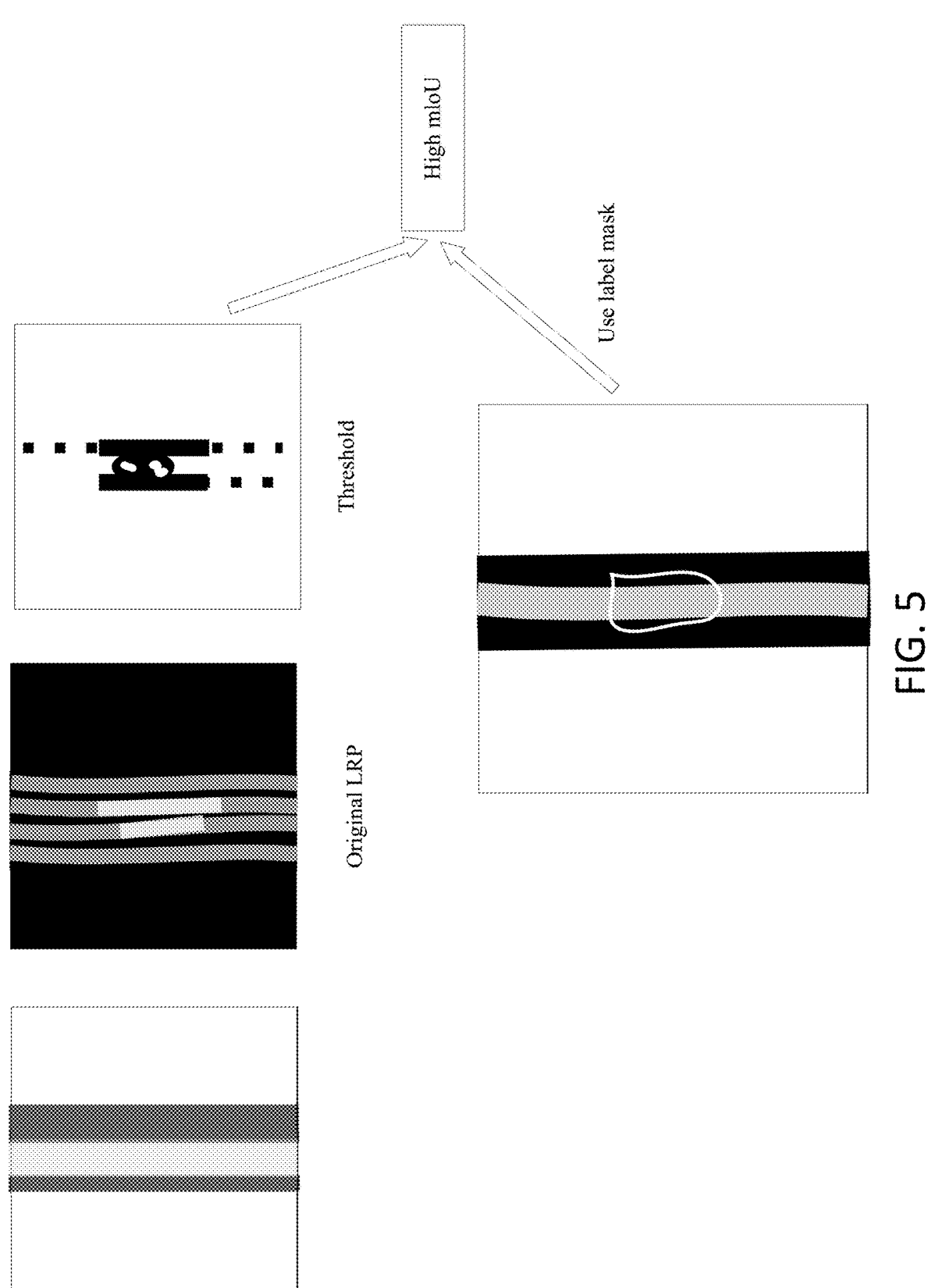
FIG. 5 shows use of LRP to address a site that is classified incorrectly.

For detection, the relevance map given by the LRP algorithm can be used to search for possible wrong annotations in the image by computing the similarity between the annotation and the relevance given by the LRP. For example, as shown in FIG. 5, the image is incorrectly classified. The highlighted portion of FIG. 5 represents the section of the image used for detection and classification by the neural network. There is high overlap with the high mIoU. LRP images can be preprocessed and mIoU of LRP and annotation can be determined. In this case, the root cause includes some left defects with shifts that are incorrectly annotated as twist defects.

Figure 6:
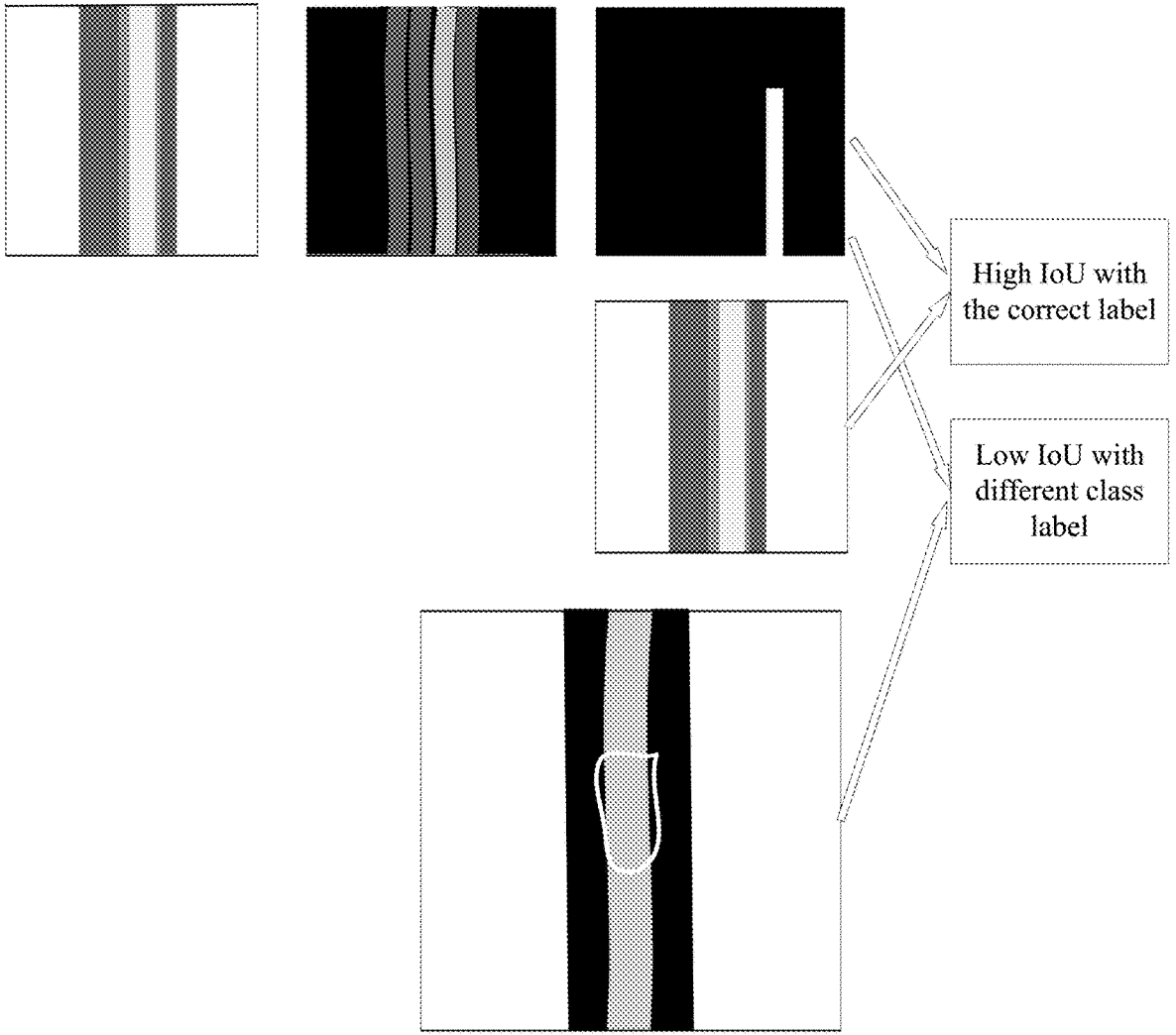
FIG. 6 shows use of LRP with a correct label based on class.

Furthermore, as shown in FIG. 6, if the model performs well, the IoU of that site with the correct annotation is higher than with other annotations. The highlighted portion of FIG. 6 represents the section of the image used for detection and classification by the neural network.

Currently, during recipe setup, it is difficult to explain deep learning results to guide next steps. Users may use trial and error for performance issue debugging, which increases time to recipe (TTR). Embodiments disclosed herein can provide clear guidance on performance diagnosis, which can reduce TTR. For example, TTR may be reduced by approximately 20%. Embodiments disclosed herein also improve ease of use and reduce necessary support at a manufacturing facility. With directly feedback inside a neural network, deep learning-based detection and classification will be easier to use. Manufacturing facilities can use deep learning-based detection and classification more intuitively.

Figure 7:
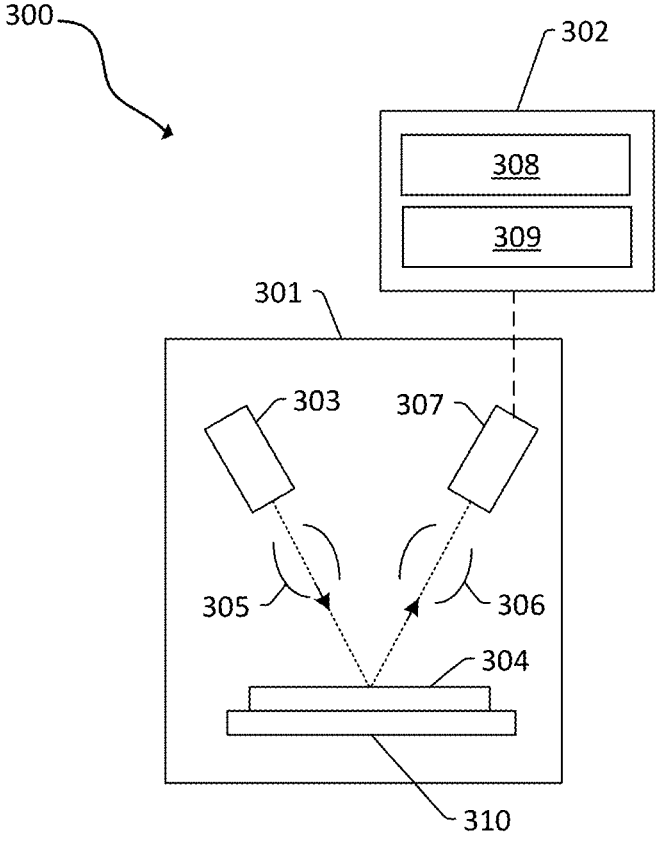
FIG. 7 is a diagram of a system embodiment in accordance with the present disclosure.

FIG. 7 is a block diagram of an embodiment of a system 300. The system 300 includes a wafer inspection tool (which includes the electron column 301) configured to generate images of a wafer 304.

The wafer inspection tool includes an output acquisition subsystem that includes at least an energy source and a detector. The output acquisition subsystem may be an electron beam-based output acquisition subsystem. For example, in one embodiment, the energy directed to the wafer 304 includes electrons, and the energy detected from the wafer 304 includes electrons. In this manner, the energy source may be an electron beam source. In one such embodiment shown in FIG. 7, the output acquisition subsystem includes electron column 301, which is coupled to computer subsystem 302. A stage 310 may hold the wafer 304.

As also shown in FIG. 7, the electron column 301 includes an electron beam source 303 configured to generate electrons that are focused to wafer 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the wafer 304 (e.g., secondary electrons) may be focused by one or more elements 306 to detector 307. One or more elements 306 may include, for example, a scanning subsystem, which may be the same scanning subsystem included in element(s) 305.

The electron column 301 also may include any other suitable elements known in the art.

Although the electron column 301 is shown in FIG. 7 as being configured such that the electrons are directed to the wafer 304 at an oblique angle of incidence and are scattered from the wafer 304 at another oblique angle, the electron beam may be directed to and scattered from the wafer 304 at any suitable angles. In addition, the electron beam-based output acquisition subsystem may be configured to use multiple modes to generate images of the wafer 304 (e.g., with different illumination angles, collection angles, etc.). The multiple modes of the electron beam-based output acquisition subsystem may be different in any image generation parameters of the output acquisition subsystem.

Computer subsystem 302 may be coupled to detector 307 as described above. The detector 307 may detect electrons returned from the surface of the wafer 304 thereby forming electron beam images of the wafer 304. The electron beam images may include any suitable electron beam images. Computer subsystem 302 may be configured to perform any of the functions described herein using the output of the detector 307 and/or the electron beam images. Computer subsystem 302 may be configured to perform any additional step(s) described herein. A system 300 that includes the output acquisition subsystem shown in FIG. 7 may be further configured as described herein.

It is noted that FIG. 7 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 7 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The computer subsystem 302 includes a processor 308 and an electronic data storage unit 309. The processor 308 may include a microprocessor, a microcontroller, or other devices.

The computer subsystem 302 may be coupled to the components of the system 300 in any suitable manner (e.g., via one or more transmission media, which may include wired and/or wireless transmission media) such that the processor 308 can receive output. The processor 308 may be configured to perform a number of functions using the output. The wafer inspection tool can receive instructions or other information from the processor 308. The processor 308 and/or the electronic data storage unit 309 optionally may be in electronic communication with another wafer inspection tool, a wafer metrology tool, or a wafer review tool (not illustrated) to receive additional information or send instructions.

The processor 308 is in electronic communication with the wafer inspection tool, such as the detector 307. The processor 308 may be configured to process images generated using measurements from the detector 307. For example, the processor may perform embodiments of the method 100 or method 200.

The computer subsystem 302, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 308 and electronic data storage unit 309 may be disposed in or otherwise part of the system 300 or another device. In an example, the processor 308 and electronic data storage unit 309 may be part of a standalone control unit or in a centralized quality control unit. Multiple processors 308 or electronic data storage units 309 may be used.

The processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 308 to implement various methods and functions may be stored in readable storage media, such as a memory in the electronic data storage unit 309 or other memory.

If the system 300 includes more than one computer subsystem 302, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 308 may be configured to perform a number of functions using the output of the system 300 or other output. For instance, the processor 308 may be configured to send the output to an electronic data storage unit 309 or another storage medium. The processor 308 may be further configured as described herein.

The processor 308 or computer subsystem 302 may be part of a defect review system, an inspection system, a metrology system, or some other type of system. Thus, the embodiments disclosed herein describe some configurations that can be tailored in a number of manners for systems having different capabilities that are more or less suitable for different applications.

The processor 308 may be communicatively coupled to any of the various components or sub-systems of system 300 in any manner known in the art. Moreover, the processor 308 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 308 and other subsystems of the system 300 or systems external to system 300.

Various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 308 (or computer subsystem 302) or, alternatively, multiple processors 308 (or multiple computer subsystems 302). Moreover, different sub-systems of the system 300 may include one or more computing or logic systems. Therefore, the above description should not be interpreted as a limitation on the present disclosure but merely an illustration.

In an instance, the processor 308 is GPU. In another instance, the processor 308 is CPU.

The processor 308 can perform any of the embodiments disclosed herein, include the embodiment of FIG. 2. The processor 308 also may be configured to perform other functions or additional steps using the output of the system 300 or using images or data from other sources. In an instance, the processor 308 is configured to generate a plurality of semiconductor images from data received from the detector. Defect detection and classification can performed on the plurality of semiconductor images using a deep learning model with the processor 308. The processor can apply a LRP algorithm on the semiconductor images from the deep learning model. The processor 308 can determine a relevance map based on the LRP propagation algorithm. The processor 308 can determine a mean intersection over union score between the relevance map and a ground truth. The processor 308 can determine a part of one of the semiconductor images that contributed to the classifying using the deep learning model based on the relevance map and the mean intersection over union score.

An additional embodiment relates to a non-transitory computer-readable medium storing program instructions executable on a controller for performing a computer-implemented method for determining a height of an illuminated region on a surface of a wafer, as disclosed herein. In particular, as shown in FIG. 2, electronic data storage unit 309 or other storage medium may contain non-transitory computer-readable medium that includes program instructions executable on the processor 308. The computer-implemented method may include any step(s) of any method(s) described herein.

In an instance, the electronic data storage unit 309 can include one or more programs for executing steps on one or more computing devices. The steps include performing defect detection and classification on a plurality of semiconductor images using a deep learning model. A LRP algorithm can be applied on the semiconductor images from the deep learning model. A relevance map can be determined based on the LRP algorithm. A mean intersection over union score between the relevance map and a ground truth can be determined. A part of one of the semiconductor images that contributed to the classifying using the deep learning model can be determined based on the relevance map and the mean intersection over union score. The relevance map can be based on a relevance of the output layer and relevance of early layers. In an instance, the relevance map is normalized. The steps also can include generating the semiconductor images using data from a wafer inspection tool that uses an electron beam or sending instructions to obtain the semiconductor images.

While described with respect to images formed from an electron beam, the embodiments described herein can be performed using images formed from a photon beam. Thus, the energy beam can be an electron beam or a photon beam. This photon beam can be generated using a laser or broad band plasma source. The wafer may be held on a chuck in the path of the photon beam. A detector can capture the photon beam reflected from the wafer.

The embodiments described herein can use a deep learning model, which may be a CNN or other type of application. This type of approach is sometimes referred to as an end-to-end learning strategy. For example, in one embodiment, the generative model is a deep generative model. In another embodiment, the generative model is a machine learning model. For example, the generative model may be configured to have a deep learning architecture in that the generative model may include multiple layers, which perform a number of algorithms or transformations. The generative model may also include one or more encoder side layers and/or one or more decoder side layers. The number of layers on one or both sides of the generative model may vary and is generally use case dependent. The deep generative and machine learning models may include any such suitable models known in the art that can be configured to perform the functions described herein.

In an embodiment, the generative model is a CNN. The generative model may have any CNN configuration or architecture known in the art. In general, a large variety of different CNN architectures are possible and known in the art.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:

directing an electron beam at a wafer using an electron beam source in a wafer inspection tool;

receiving electrons returned from the wafer at a detector in the wafer inspection tool;

generating a plurality of semiconductor images of the wafer using data from the detector about the electrons returned from the wafer;

performing defect detection and classification on the plurality of semiconductor images using a processor with a deep learning model;

applying, using the processor, a layer-wise relevance propagation algorithm on the semiconductor images from the deep learning model;

determining, using the processor, a relevance map based on the layer-wise relevance propagation algorithm, wherein the relevance map is based on a relevance of an output layer and relevance of early layers, wherein the relevance of the early layers is determined for each layer using an equation $$R_i = \sum_j \frac{a_i w_{ij}}{\sum_i a_i w_{ij}} R_j,$$

and wherein $R_i$ is the relevance of a neuron i at a first layer, $R_j$ is a relevance of the neuron j at a second layer, $a_i$ is an activation of the neuron i, and $w_{ij}$ is a weight between the neuron i and the neuron j;

determining, using the processor, a mean intersection over union score between the relevance map and a ground truth;

determining, using the processor, a part of one of the semiconductor images that contributed to the classification using the deep learning model based on the relevance map and the mean intersection over union score, wherein determining the part of the one of the semiconductor images further uses at least one of an overlay of the mean intersection over union score and the one of the semiconductor images or an overlay of the relevance map and the one of the semiconductor images;

changing an annotation of a training image for the deep learning model and/or a class code of a training image for the deep learning model based on the part of the semiconductor images that contributed to the classification; and performing a second defect detection and classification on the plurality of semiconductor images using the processor with the deep learning model after changing the annotation and/or the class code.

2. The method of claim 1, wherein the relevance map is normalized.

3. The method of claim 1, further comprising smoothing the plurality of semiconductor images using the processor.

4. The method of claim 1, wherein the method includes changing the annotation of the training image for the deep learning model when a mean intersection over union score is less than a threshold.

5. The method of claim 1, wherein the method includes changing the class code of the training image for the deep learning model.

6. A wafer inspection tool comprising:

an electron beam source that generates an electron beam;

a stage configured to hold a wafer in a path of the electron beam;

a detector that receives electrons returned from the wafer; and a processor in electronic communication with the detector, wherein the processor is configured to:

generate a plurality of semiconductor images of the wafer using data received from the detector about the electrons returned from the wafer;

perform defect detection and classification on the plurality of semiconductor images using a deep learning model;

apply a layer-wise relevance propagation algorithm on the semiconductor images from the deep learning model;

determine a relevance map based on the layer-wise relevance propagation algorithm, wherein the relevance map is based on a relevance of an output layer and relevance of early layers, wherein the relevance of the early layers is determined for each layer using an equation $$R_i = \sum_j \frac{a_i w_{ij}}{\sum_i a_i w_{ij}} R_j,$$

and wherein $R_i$ is the relevance of a neuron i at a first layer, $R_j$ is a relevance of the neuron j at a second layer, $a_i$ is an activation of the neuron i, and $w_{ij}$ is a weight between the neuron i and the neuron j;

determine a mean intersection over union score between the relevance map and a ground truth;

determine a part of one of the semiconductor images that contributed to the classification using the deep learning model based on the relevance map and the mean intersection over union score, wherein determining the part of the one of the semiconductor images further uses at least one of an overlay of the mean intersection over union score and the one of the semiconductor images or an overlay of the relevance map and the one of the semiconductor images;

change an annotation of a training image for the deep learning model and/or a class code of a training image for the deep learning model based on the part of the semiconductor images that contributed to the classification; and perform a second defect detection and classification on the plurality of semiconductor images using the processor with the deep learning model after changing the annotation and/or the class code.

7. The wafer inspection tool of claim 6, wherein the relevance map is normalized.

8. The wafer inspection tool of claim 6, wherein the processor is configured to change the annotation of the training image for the deep learning model when a mean intersection over union score is less than a threshold.

9. The wafer inspection tool of claim 6, wherein the processor is configured to change the class code of the training image for the deep learning model.

10. A non-transitory computer-readable storage medium, comprising one or more programs for executing the following steps on one or more computing devices:

sending instructions to a wafer inspection tool to direct an electron beam at a wafer using an electron beam source;

generating a plurality of semiconductor images of the wafer using data from a detector that received electrons returned from the wafer;

performing defect detection and classification on the plurality of semiconductor images using a deep learning model;

applying a layer-wise relevance propagation algorithm on the semiconductor images from the deep learning model;

determining a relevance map based on the layer-wise relevance propagation algorithm, wherein the relevance map is based on a relevance of an output layer and relevance of early layers, wherein the relevance of the early layers is determined for each layer using an equation $$R_i = \sum_j \frac{a_i w_{ij}}{\sum_i a_i w_{ij}} R_j,$$

and wherein $R_i$ is the relevance of a neuron i at a first layer, $R_j$ is a relevance of the neuron j at a second layer, $a_i$ is an activation of the neuron i, and $w_{ij}$ is a weight between the neuron i and the neuron j;

determining a mean intersection over union score between the relevance map and a ground truth;

determining a part of one of the semiconductor images that contributed to the classification using the deep learning model based on the relevance map and the mean intersection over union score, wherein determining the part of the one of the semiconductor images further uses at least one of an overlay of the mean intersection over union score and the one of the semiconductor images or an overlay of the relevance map and the one of the semiconductor images;

changing an annotation of a training image for the deep learning model and/or a class code of a training image for the deep learning model based on the part of the semiconductor images that contributed to the classification; and performing a second defect detection and classification on the plurality of semiconductor images using the processor with the deep learning model after changing the annotation and/or the class code.

11. The non-transitory computer-readable storage medium of claim 10, wherein the relevance map is normalized.

12. The non-transitory computer-readable storage medium of claim 10, wherein the steps further comprise generating the semiconductor images using data from a wafer inspection tool that uses an electron beam.

13. The non-transitory computer-readable storage medium of claim 10, wherein the steps include changing the annotation of the training image for the deep learning model when a mean intersection over union score is less than a threshold.

14. The non-transitory computer-readable storage medium of claim 10, wherein the steps include changing the class code of the training image for the deep learning model.

* * * * *